(12) United States Patent
De Volder et al.

(10) Patent No.: US 7,823,499 B2
(45) Date of Patent: Nov. 2, 2010

(54) SURFACE TENSION SEAL

(75) Inventors: Michaël De Volder, Borgerhout (BE);
Dominiek Reynaerts, Haasrode (BE)

(73) Assignee: K.U. Leuven Research & Development, Leuven (BE)

( * ) Notice: Subject to any disclaimer, the term of this patent is extended or adjusted under 35 U.S.C. 154(b) by 682 days.

(21) Appl. No.: 11/587,989

(22) PCT Filed: May 2, 2005

(86) PCT No.: PCT/BE2005/000065

§ 371 (c)(1),
(2), (4) Date: Sep. 21, 2007

(87) PCT Pub. No.: WO2005/106296

PCT Pub. Date: Nov. 10, 2005

(65) Prior Publication Data

US 2008/0277881 A1   Nov. 13, 2008

(30) Foreign Application Priority Data

Apr. 30, 2004   (GB) ................................. 0409687.1

(51) Int. Cl.
*F16J 15/40* (2006.01)
*F15B 15/14* (2006.01)
(52) U.S. Cl. .................................... 92/162 R; 92/165 R
(58) Field of Classification Search ................ 92/162 R, 92/165 R
See application file for complete search history.

(56) References Cited

U.S. PATENT DOCUMENTS 2,547,428 A   4/1953   Ziherl (Continued)

FOREIGN PATENT DOCUMENTS

DE   28 42 694 A1   4/1980

(Continued)

OTHER PUBLICATIONS

L.J. Kricka, P. Wilding, J Pfahler, J. Harley, H. Bau; "Liquid Transport in Micron and Submicron Channels", SPIE 1167 Precision Engineering and Optomechanics, 1989, pp. 159-168.

(Continued)

*Primary Examiner*—Thomas E Lazo
(74) *Attorney, Agent, or Firm*—Bacon & Thomas, PLLC

(57) ABSTRACT

Present invention involves a seal means suitable to replace the classic seals. For instance the seal means of present invention can be a liquid seal ring (7) to replace the classic rubber seal rings. Such is liquid O-ring can be adapted to resists the actuation pressure relying on surface tension forces. Such liquid O-rings can also be linked in series, hereby increasing the maximum seal pressure. In a preferred embodiment the seal means of present invention comprises two major components, a surface tension seal (7) and a pressure divider (4). The pressure divider will comprise a system that generates a pressure drop. Such pressure divider can be located before the surface tension seal and perform the first pressure drop. The combination of these two systems has the advantage that the surface tension seal is able to reduce the leakage to zero or essentially zero and that the pressure divider is able to perform a large pressure drop. Nevertheless, the surface tension seal can also create a considerable pressure drop. This means that in applications where the seal pressure of the surface tension seal is not exceeded, the pressure divider can be omitted. However, omitting the pressure divider will always result in tighter tolerances when manufacturing the seal.

37 Claims, 8 Drawing Sheets

U.S. PATENT DOCUMENTS

Figure 1:
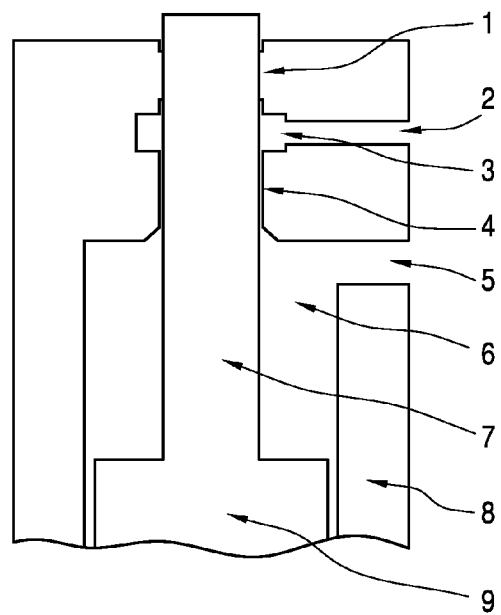

| | | | |
|---|---|---|---|
| 2,690,939 A * | 10/1954 | Whaley | 92/165 R |
| 2,927,829 A | 3/1960 | Porter, Jr. | |
| 3,038,731 A | 6/1962 | Milleron | |
| 3,502,342 A | 3/1970 | Albert | |
| 3,540,741 A * | 11/1970 | Lefebvre | 92/168 |
| 3,683,754 A * | 8/1972 | Stuyvenberg | 92/165 R |
| 3,734,578 A | 5/1973 | Rosenweig | |
| 4,166,523 A * | 9/1979 | Fujii et al. | 277/565 |
| 4,197,786 A * | 4/1980 | Pillon | 92/165 R |
| 4,428,566 A * | 1/1984 | de Baan et al. | 267/64.15 |
| 5,015,000 A * | 5/1991 | Perini | 92/165 R |
| 5,107,970 A * | 4/1992 | Driessen et al. | 277/514 |
| 5,150,805 A | 9/1992 | Vinals | |
| 7,607,383 B2 * | 10/2009 | Nagel | 92/165 R |

FOREIGN PATENT DOCUMENTS

| | | |
|---|---|---|
| DE | 32 07 061 A1 | 9/1983 |
| DE | 36 07 156 A1 | 9/1987 |
| FR | 1223318 | 6/1960 |

OTHER PUBLICATIONS

Michael B Binnard, "Leg Design for a Small Walking Robot", Masters Thesis. MIT. 1995.

J Peirs, D Reynaerts, H. Van Brussel, "Design of Miniature Parallel Manipulators for Integration in a Self-Propelling Endoscope", Sensors and Actuators, v 85, 2000. pp. 409-417.

S. Butefisch, V. Seidemann, S. Buttgenbach, "Novel Micro-Pneumatic Actuator for MEMS". Sensors and Actuators, A 97-98, 2002, pp. 638-645.

P. Wapner, W Hoffman, "Hydraulic Actuation Based on Flow of Non-Wetting Fluids in Micro-Channels", Sensors and Actuators. B 85, 2002, pp. 52-60.

N R Tas, T S. J Lammerink, J.W. Berenschot, M. Elwenspoek, A. Van Den Berg, "Scaling Behaviour of Pressure-Driven Micro-Hydraulic Systems", Nanotech, V. 1. 2002, pp. 174-177.

X. Song. D, Reynaerts, W , Meeusen, H. Van Brussel, "Investigation of Micro-EDM for Silicon Microstructure Fabrication", Symposium on Micromachining and Microfabrication, Paris, 1999, pp. 792-799.

J Harley, H. Bau, "Fluid Flow in Micron and Submicron Size Channels", Proceedings of IEEE, 1989, pp. 25-28.

J. Pfahler, J. Harley, H. Bau, "Liquid Transport in Micron and Submicron Channels", Sensors and Actuators, A21-A23, 1990, pp. 431-434.

* cited by examiner

SURFACE TENSION SEAL

TECHNICAL FIELD OF THE INVENTION

This invention relates in general to a surface tension seal based on a fluid, which is particularly suitable to seal hydraulic, pneumatic or hydro pneumatic attenuators. The invention also relates to actuators, in particular microactuators, comprising at least one surface tension seal. The fluid seal can be used to seal a gas or a liquid. The surface tension seal can be used as a dynamic seal or as a static seal. A particular technical advantage is that this seal is characterised by low friction and/or low leakage. The invention is applicable for both macro and micro devices but is particularly interesting for the latter.

BACKGROUND OF THE INVENTION

This invention relates to a fluid seal, preferably a liquid seal, to seal a gas or a liquid in for instance hydraulic cylinders, pneumatic cylinders or hydropneumatic cylinders. In an embodiment of present invention a seal has been described which can be divided in two major components. The first component will be referred to as the "surface tension seal", while the second will be referred to as the "pressure divider".

The operation principle of the surface tension seal is comparable to that of sealing rubber O-rings but the seal ring is made of a fluid instead of rubber. A liquid O-ring for instance resists the actuation pressure relying on surface tension forces. These O-rings can be linked in series, hereby increasing the maximum seal pressure.

The pressure divider is a system that generates a pressure drop by means of an hydraulic equivalent system to an electric voltage divider. The pressure divider is located before the surface tension seal and performs the first pressure drop. The main advantage of combining these two systems is that the surface tension seal is able to reduce the leakage to zero and that the pressure divider is able to perform a large pressure drop. Nevertheless, the surface tension seal can also create a considerable pressure drop. This means that in applications where the seal pressure of the surface tension seal is not exceeded, the pressure divider can be omitted. However, omitting the pressure divider will always result in tighter tolerances when manufacturing the seal.

The presented seal technology is most interesting for micro devices since surface tension is one of the strongest forces at microscale. In addition, the described seal is easy to miniaturize since no complex components are needed. The presented seal offers for instance a solution for the sealing of pneumatic actuators, of hydropneumatic actuators or of hydraulic actuators and is in particular interesting for hydraulic microactuators since the maximum seal pressure scales inversely proportional to size and the seal can be manufactured as one monolithic part with the actuator cylinder.

An hydraulic actuator suitable for present invention can for instance hydraulic cylinders or hydraulic clamp cylinders as for instance made available to the public by companies such as MICO, AHP Merkle, LJM Hydraulik, Spx Fluid Power, Amf Andreas Maier, Atos, De-Sta-Co, Douche Hydro, Duplomatic, Oleodinamica, Duplomatic, Eaton—Hydro Line, Eaton—Vickers, Glual Hidraulica, Regnier, Rexroth—Industrial Hydraulics, Ljm Hydraulik. Hydraulic actuators suitable for present invention can also be linear cylinders, hydraulic light-alloy cylinders, single-acting and double-acting hydraulic actuators, aluminum hydraulic cylinders, flat cylinders, hollow piston cylinders, telescopic hydraulic cylinders, hydraulic locking cylinders for injection molding machines, hydraulic pancake lock-nut cylinders, pancake lock nut cylinders, hydraulic rotary actuators, rotary cylinders, hydraulic servo-cylinders, lock-nut hydraulic cylinders, as for instance been produced by Ds Dynatiec, Eckart, Olaer Industries, HKS, Montanhydraulik, Atos, Glual Hidraulica, Enerpac, Ljm Hydraulik and Hidraulica Um Plopeni. Also Pneumatic cylinders or hydropneumatic cylinders from Farger & Joosten or Eckart, water hydraulic cylinders from LJM Hydraulik and tie rod hydraulic cylinders from Eaton—Hydro Line or Universal Hydraulik and mini-hydraulic cylinders from Hunger Hydraulik ca be suitable for present invention.

The surface tension seal of present invention is particularly suitable for microdevices. During the last decades several scientific studies focused on the choice of appropriate actuation technologies for microdevices. Especially electrostatic and electromagnetic motors were investigated. However, recent research shows that hydraulic systems develop a higher force, work and power density at micro scale (Bütefisch S., et al. Sensors and actuators A, 2002, 638-645; Binnard, M., Leg Design for a Small Walking Robot, Master's thesis MIT, 1995, Wapner P., Hoffman W., Sensors and actuators B, 2000, 52-60 and Peirs J., et al., Sensors and Actuators A, Vol. 85, 2000, 409-417).

Microhydraulic systems have for instance been described in N. R. Tas, T. S. J. et al. Pages: 174-177 Nanotech 2002 Vol. 1 and fluidic microdevices have for instance been described in Harley, J. et al. 1989, Proc. IEEE pp. 25-28; Kricka, L, et al. 1989, "Liquid Precision Engineering and Optomechanics Vol. 1167, pp. 159-168 and Pfahler, J., et al. 1990, Sensors and Actuators, Vol. A21-A23, pp. 431-434 and micropneumatic systems have for instance been described in Bütefisch S et al Sensors and actuators A, 2002, 638-645.

Despite these promising properties, hydraulic actuators are rare in Micro Systems Technology (MST) because of inherent sealing difficulties. Most existing miniature hydraulic actuators suffer from either leakage or high friction. These problems are due to the fact that the typically used rubber O-rings or lip seals are not appropriate for micro devices. The main technological barrier for the development of such micro actuators is the lack of an appropriate sealing technology.

Thus, there is a need in the art for a novel for low friction seal. The present invention solves the problems of the related art by replacing traditional rubber O-rings for instance by a fluid O-rings, preferably by a liquid O-ring. The latter resist the actuation pressure relying on surface tension forces. A seal in accordance with this invention has a number of advantages. Due to the use of a surface tension seal, the solid-solid contact between the seal and the moving part can be avoided. Therefore, friction and seal wear can be reduced substantially. If the applied pressure does not exceed its designed value, there will be no leakage. This is an important property for all applications that need a hermetic seal. Furthermore, this seal is easy to miniaturize and opens new prospective for the sealing of fluidic microdevices. The technology of present invention can also be used in any other applications where a low leakage, a low friction or both are desired as for instance in precision mechanics.

Besides high seal pressures, an important advantage of this technology are that the solid-solid contact between the seal and the moving part can be avoided and consequently, friction and seal wear can be reduced substantially.

Typical applications for this microactuator are process automation, inspection and minimally invasive surgery.

ILLUSTRATIVE EMBODIMENT OF THE INVENTION

Description of the Invention

The invention will now be described by way of example and with reference to the accompanying drawings.

FIG. 1 illustrates a possible configuration of the invention. In this configuration the invention seals the piston (7) of a piston type actuator. The surface tension seal (1) and the pressure divider (2-4) are integrated in the cylinder wall (8). The seal and cylinder can be manufactured as one monolithic structure or can be assembled out of different components. The former approach can be advantageous for a microactuator since microdevices are difficult to assemble.

Figure 2:
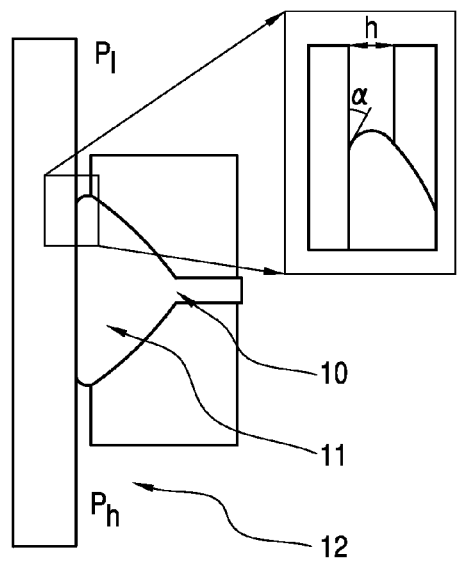

In the case of FIGS. 1 and 2, the surface tension seal consists of an annular cavity (1,11), which is filled with a seal fluid. The cavity is filled until the opposing surface (7) in FIG. 1 is reached, hereby separating a fluid 1 at high pressure ($P_h$) from a fluid 2 at low pressure ($P_l$). The invention can seal both liquid and gaseous fluids, and both over-pressures and under-pressures (eg. vacuum). The seal fluid has preferably a high surface tension. For instance water, mercury, gallium or any other fluid that has a surface tension different from zero can be used. It can be interesting to use eutectic alloys or undercooling to keep high surface tension materials liquid at the operation temperature. For instance pure gallium steadily remains undercooled at room temperature. This means that a gallium seal can be used below its melting temperature, for example at room temperature, without needing a heating element to keep the gallium in liquid state.

Besides mercury, water and gallium are promising sealing fluids. The main advantages of water are that it is harmless and readily available. This makes water interesting for applications where strict material regulations are imposed as in the food industry or for minimally invasive surgery. However, in other applications Ga is more attractive because of its excellent surface tension ($\gamma Ga=0.7$ N/m, $\gamma Hg=0.5$ N/m, $\gamma H2O=0.07$ N/m). According to the directive 67/548/EEC, Ga is not a dangerous product and therefore, it can be used in most applications. The main disadvantage of a Ga seal is that its melting point is just above room temperature (303 K). Consequently Ga should be heated above 303 K in order to be liquid and seal. However, pure Ga steadily remains undercooled at room conditions (293 K, 1 atm) (Mellor J. W., A comprehensive treatise on inorganic and theoretical chemistry, Longmans, Green and Co., London, 1924), and therefore, heating is not necessarily required. Another way to keep Ga liquid at room conditions is to make an eutectic alloy of for instance Ga and In. Mixing about 20% weight percent of In with Ga reduces their melting temperature to 15.3° C.

The maximum pressure drop $\Delta P=P_h-P_l$ that can be sealed is determined by the Laplace equation (i). This equation states that a curved fluid surface generates a pressure drop ($\Delta P$) that is proportional with the surface tension ($\gamma$) of the fluid and is inversely proportional to the two main radii of curvature ($R_1$, $R_2$). The dominant curvature usually depends on the dimensions of the gap h and the contact angle $\alpha$ (see FIG. 2 and equation ii).

$$\Delta P = \gamma \cdot \left( \frac{1}{R_1} + \frac{1}{R_2} \right) \quad \text{(i)}$$

$$R = \frac{h}{2\cos(\alpha)} \quad \text{(ii)}$$

Equations (i) and (ii) show that the seal pressure can be maximized by reducing the gap width (h) and the contact angle ($\alpha$), as shown in FIG. 2. Another way of maximizing the seal pressure is to increase the surface tension ($\gamma$). Furthermore, the contact angle $\alpha$, as shown in FIG. 2, should be smaller than 90° for the seal to work.

Figure 3:
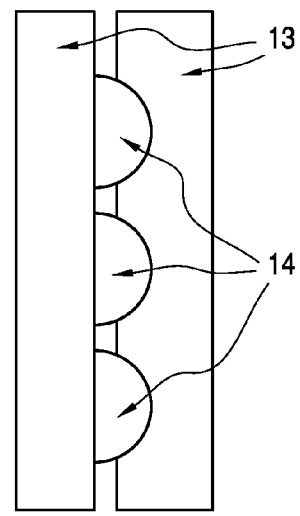

The surface tension seal can be mounted in series as shown in FIG. 3. By using a series arrangement of seals, the total maximum seal pressure can be increased while the seal fluid and the gap h (see FIG. 2) remain the same. In order to have a good cooperation between the different seals, an appropriate compressibility and volume of the fluid between the different seals must be chosen.

The seal fluid or liquid can be mounted in the seal cavity by any preferred means. For instance a supply channel (10) that connects the seal cavity to a seal fluid or liquid reservoir can be used to force the fluid in the seal cavity. Alternatively, the seal fluid can be brought in the cavity through the gap h (see FIG. 2). Another approach is to mount the seal in solid state and heat it above its melting point once mounted. For example in the case of gallium, which has a melting point just above room temperature (around 30° C.), this can be an interesting approach.

Figure 4:
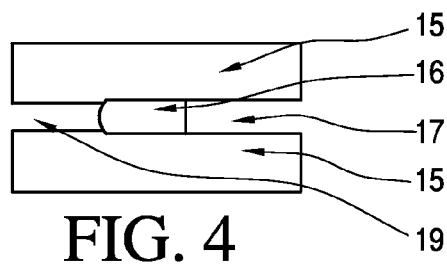
Figure 5:
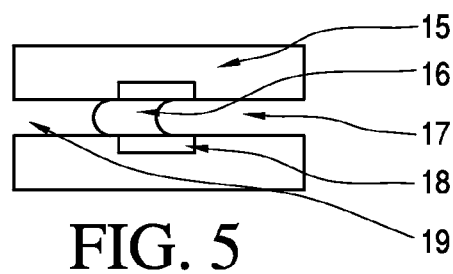
Figure 6:
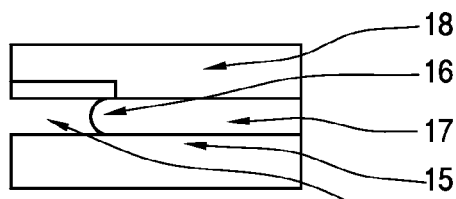

The seal can be anchored using a change in gap size, like in the case of a seal cavity (see FIGS. 1-4 and equations i-ii), but can also be anchored using a change in wetting property (see FIG. 5-6) or any other preferred mean. In FIGS. 4, 5, and 6, (15) is a non-wetting surface while (18) is a wetting surface. In the case of anchoring by a change in wetting property, the seal is kept in position by repulsive forces exerted by non-wetting surfaces and/or attractive forces exerted by wetting surfaces. The use of a change in wetting property is particularly interesting in applications where the two sealed parts do not move axially with respect to each other (eg. static and rotating seals). In these applications, both sides of the fluid ring can generate a pressure drop as shown in FIG. 5.

Furthermore, it is possible to use the same fluid for the surface tension seal as for the fluid to be sealed. An example of this arrangement is shown in FIG. 6. An advantage of this approach is that these seals are easy to mount but the fact that the fluid to be sealed and the seal fluid must be the same can be a limitation. Here again, the seal can be anchored by a change in gap size, a change in wetting properties or any other preferred mean as shown in FIG. 6.

In what follows, this application describes a pressure dividing system that allows the surface tension seals, as described above, to seal higher pressures. This technology does not increase the wear or the leakage of the seal, and does not affect its hermetic properties. The operation of the pressure divider will be described by means of the piston seal of FIG. 1. The pressure divider forces the sealed fluid to flow through a restriction (4) before it reaches the surface tension seal (1) described above. A channel (2) is provided to allow the small amount of fluid that passes through the restriction to flow back to for instance a reservoir. A pressure rectifier for instance an annular cavity (3) can be added to the seal in order to avoid radial fluctuations in the pressure working on the surface tension seal.

Figure 7:
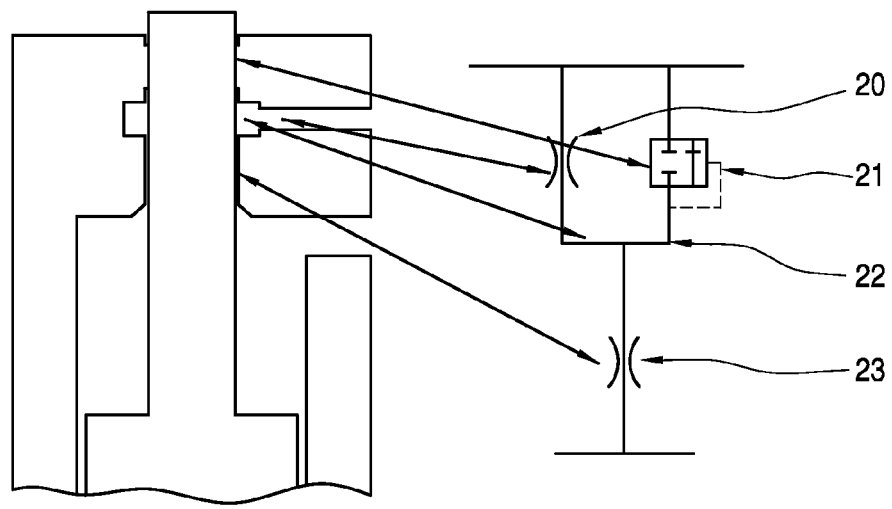

The operation of the pressure divider can be understood by looking at the simplified representation of FIG. 7 left. In this figure, the surface tension seal (21) is represented by a valve that opens when the inlet pressure exceeds a threshold value, i.e. the maximum seal pressure of the surface tension seal. The leakage channel (20) is a represented by a (low) restriction while the pressure divider restriction (23) is represented as a (high) restriction. The restriction (23) and the leakage channel (20) are a hydraulic equivalent of a voltage divider, this means that they are able to divide the pressure working on the surface tension seal.

If the flow resistance of the restriction can be made very large in comparison with the flow resistance of the leakage channel, the pressure working on the surface tension seal can be reduced considerably. For example in FIG. 1 this can easily be achieved since the flow resistance is very sensitive to the width of the clearance between the piston and the cylinder in the restriction. In the case of a rotating seal the flow resistance of the restriction can be increased using a labyrinth (55), in the case of a static seal the flow resistance can be increased by using a porous material (50) or any other preferred mean. The flow going through the leakage channel can be collected and can be handled as preferred. For instance, the leaking fluid can be accumulated in a local reservoir, can be channeled back to a low-pressure tube or can be evaporated. In the case of a hydraulic actuator, the leakage flow can be returned to the low-pressure channel right before the valve as described in FIG. 8. Furthermore, the leakage flow can be kept very low if the flow resistance of the restriction (23) and the leakage channel (20) is high enough. In applications where a low leakage through the seal is acceptable, the surface tension seal can be replaced by a restriction.

The main advantage of combining a surface tension seal with a pressure divider is that the surface tension seal is able to reduce the leakage to zero and that the pressure divider is able to perform a large pressure drop. Nevertheless, the surface tension seal can also create a considerable pressure drop. This means that in applications where the seal pressure of the surface tension seal is not exceeded, the pressure divider can be omitted. However, omitting the pressure divider will always result in tighter tolerances when manufacturing the seal.

Figure 12A:
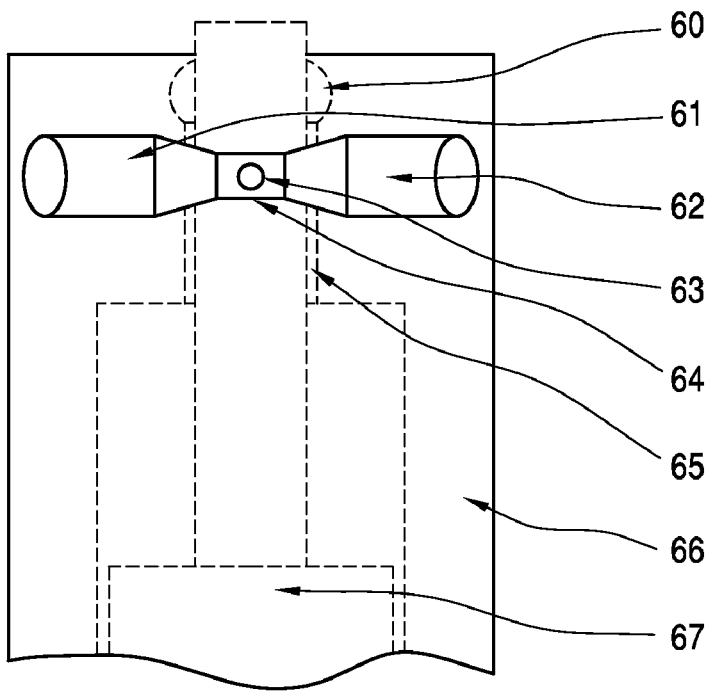
Figure 12B:
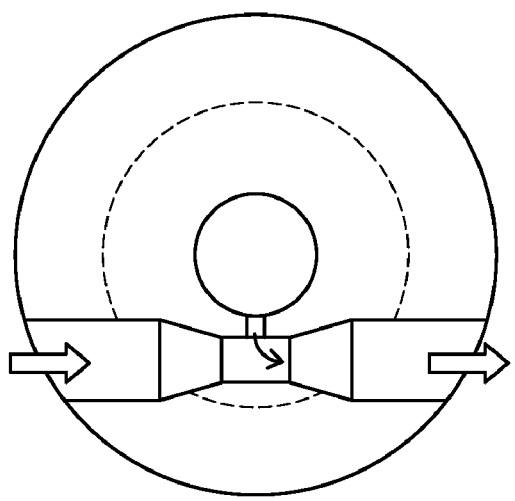
Figure 13A:
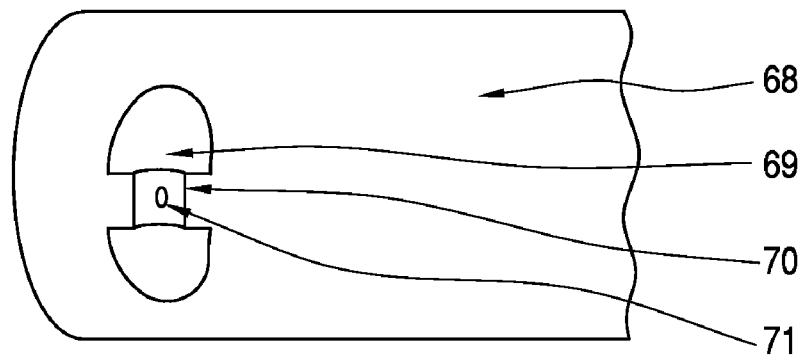
Figure 13B:
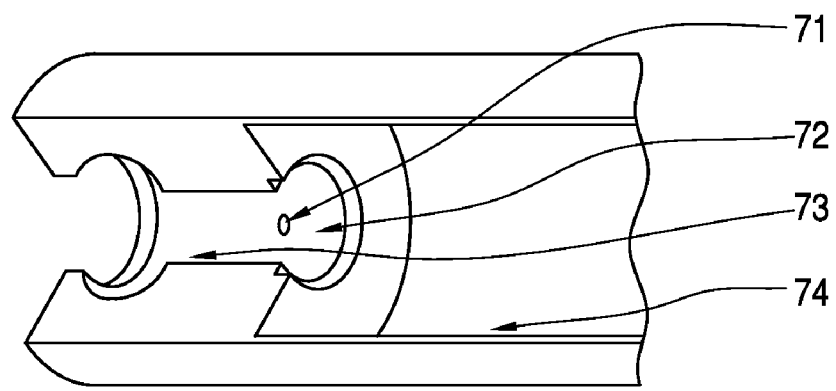

If needed, a pump can be added to the leakage channel (2) (63). This can reduce furthermore the pressure working on the surface tension seal (1, 60), and thus enhances the maximum seal pressure. In many cases this pump can be integrated in a compact way in the structure to be sealed. For instance a venturi pump (61)-(64) can be integrated in the cylinder wall of a double working actuator as depicted in FIG. 12. The pump is represented schematically in dark grey. The pump and the cylinder can be made as one monolithic part, like shown in FIG. 12 or can be made of different assembled components. FIGS. 12a and 12b show the same structure but FIG. 12b is a top view FIG. 12a. In these figures, the inside of the actuator is shown in dashed lines, while the venturi pump (61)-(64) and the contour of the actuator is shown in solid line. The venturi pump, consisting of two supply channels (61) (62), a narrowing (64) and a suction channel (63), can be fabricated by as preferred by the user. FIG. 13a shows a three dimensional section of the actuator represented in FIG. 12. This section reveals the pump (69) (70) (71) located in the cylinder wall. In FIG. 13b, the actuator is rotated over 180° with respect to FIG. 13a and a quarter of the actuator has been cut away in order to show its inside. Analogous configurations can be used for static, linear, rotational or other seal applications. If preferred other pumping mechanisms can be used.

The pump can also be located downstream of the leakage channel (2), it can for instance be located by the fluid reservoir (31).

DESCRIPTION OF CONFIGURATIONS AND FIGURES

The seal of present can be used in many different configurations. In this section, some configuration examples will be described by mean of figures. Most figures show a cross sections of the invention, these cross sections can be made for example from a cylindrical or beam shaped structure.

Figure 8:
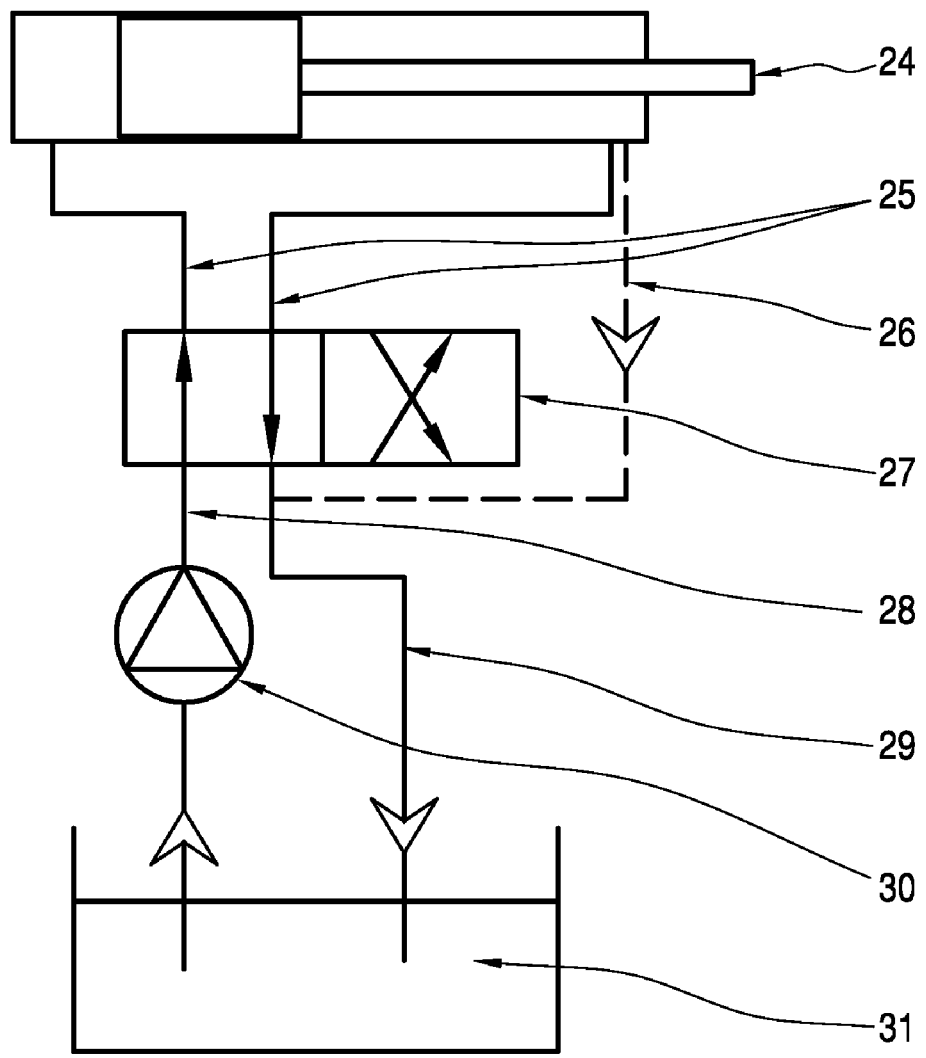
Figure 9:
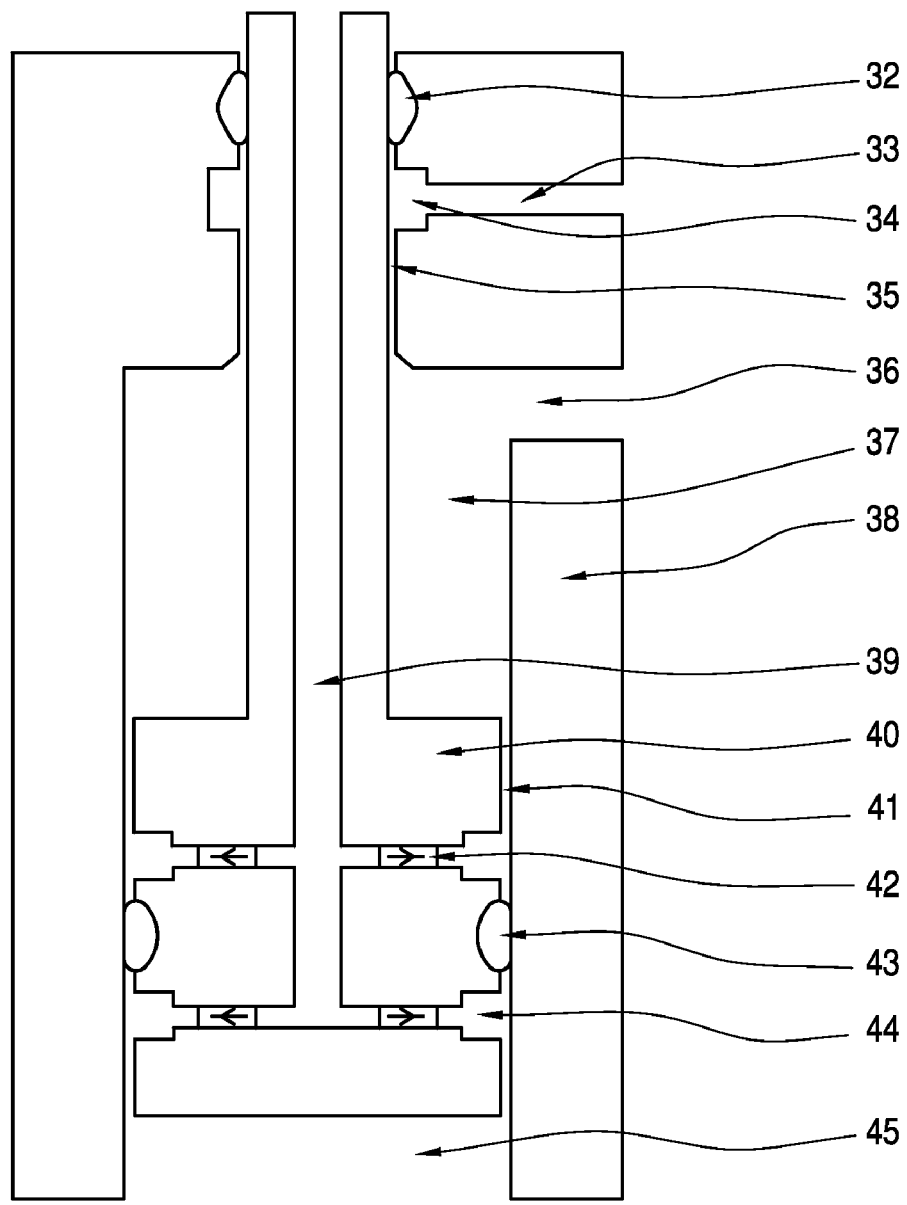

Referring now specifically to the drawings, a cross section of a hydraulic piston-type actuator, which is sealed using a single surface tension seal (1) in combination with the pressure divider (2-4) according to an embodiment of the present invention is illustrated in FIG. 1:
(1) Surface tension seal
(2) Leakage channel
(3) Pressure rectifier
(4) Restriction
(5) Actuator pressure supply
(6) Pressure chamber
(7) Piston rod
(8) Cylinder
(9) Piston FIG. 2 shows a cross section of the surface tension seal only. The seal is installed using a supply channel (10).
(10) Seal fluid supply channel
(11) Seal cavity
(12) High pressure chamber FIG. 3 sketches a series arrangement of surface tension seals (14) mounted between two parts (13). This arrangement allows enhancing the maximum sealed pressure of the seal.
(13) Side walls
(14) Surface tension seals FIGS. 4-6 show different anchoring mechanisms for the surface tension seal. FIG. 4 is based on a change in gap, while FIGS. 5 and 6 use a change in wettability of the surfaces. In FIG. 6, the surface tension fluid is the same fluid as the fluid to be sealed.
(15) Non-wetting surface
(16) Seal fluid
(17) High pressure side
(18) Wetting surface
(19) Low pressure side FIG. 7 shows a simplified representation of the surface tension seal and the pressure divider, as discussed in the description of the invention.
(20) Leakage channel
(21) Surface tension seal
(22) Pressure rectifier
(23) Restriction FIG. 8 gives an example of the outline of a complete hydraulic system. In this example the seal is used on a hydraulic actuator as shown in FIG. 1. The leakage flow is channeled to the low-pressure tube (29) right before the valve (27). A similar outline can be drawn for many other applications.
(24) Piston-type hydraulic actuator
(25) Driving channels of the actuator
(26) Leakage channel
(27) Valve
(28) High pressure channel
(29) Low pressure channel
(30) Pump
(31) Fluid reservoir FIG. 9 shows how a seal in accordance with the invention can be used to seal the piston of a fluidic actuator. In the sketched cross section, the leakage flow is channeled trough the piston to the outside world. This approach is especially interesting in the case of pneumatic actuators because the leakage of air to the outside world of air is usually less detrimental then that of a liquid. In the case of a hydraulic actuator the fluid that flows through the piston can be collected by a dedicated system. Another possibility is to omit the pressure divider and use the surface tension seal only. A series arrangement as sketched in FIG. 3 can be interesting to increase the seal pressure.

Figure 10:
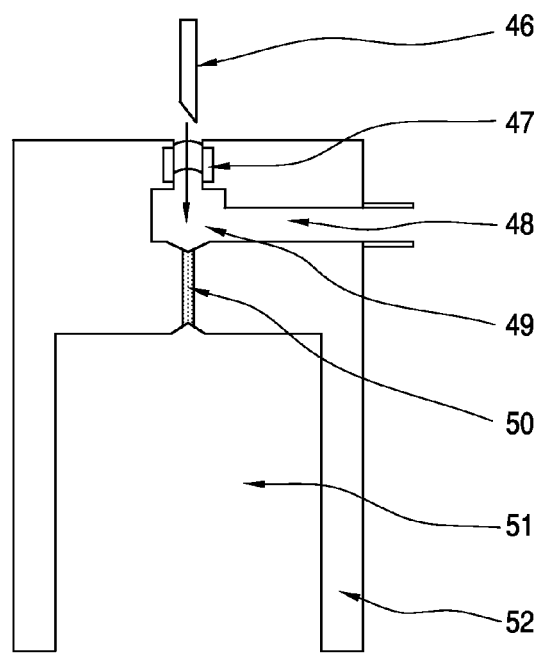
Figure 11:
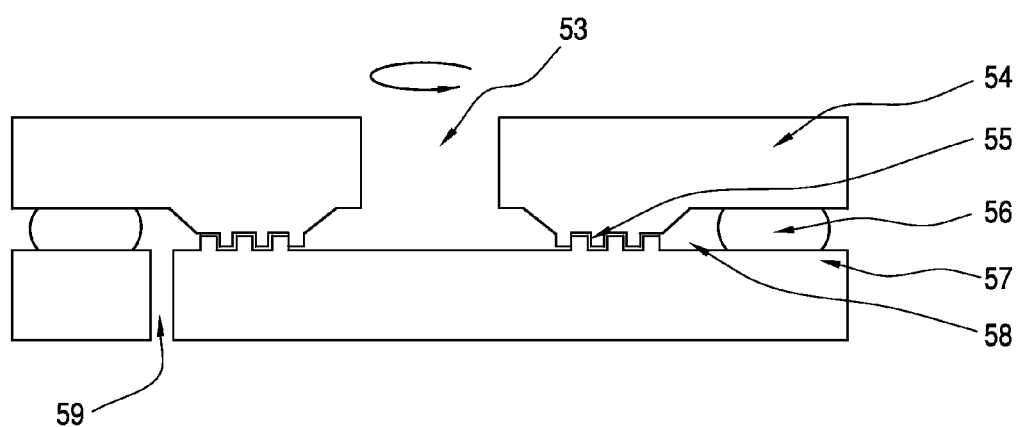

(32) Surface tension seal
(33) Leakage channel
(34) Pressure rectifier
(35) Restriction
(36) Actuator pressure supply
(37) Pressure chamber
(38) Cylinder
(39) Leakage channel
(40) Piston
(41) Restriction
(42) Check valve
(43) Surface tension seal
(44) Pressure rectifier
(45) Pressure chamber FIG. 10 shows a cross-section of a static seal in accordance with the invention. An advantage of this setup is that for example a needle can be inserted trough the surface tension seal, for example to sample the sealed fluid. In this figure the restriction of the pressure divider is a porous material and the surface tension seal is anchored by a change in wetting property in accordance with FIG. 5.

(46) Needle
(47) Surface tension seal
(48) Leakage channel
(49) Pressure rectifier
(50) Restriction
(51) High pressure vessel
(52) Vessel wall Picture 11 shows a rotating configuration of the seal in accordance with the invention. In this example, the restriction of the pressure divider is generated by a labyrinth (55).

(53) Pressurized fluid
(54) Rotator
(55) Labyrinth restriction
(56) Surface tension seal
(57) Stator
(58) Pressure rectifier
(59) Leakage channel FIG. 12 shows a section of a linear actuator with a venturi pump integrated in the actuator wall. The pump is represented schematically. FIGS. 12a and 12b show the same structure but FIG. 12b is a top view of FIG. 12a. In these figures, the inside of the actuator is shown in dashed lines, while the venturi pump (61)-(64) and the contour of the actuator is shown in solid line. The venturi pump, consisting of two supply channels (61) (62), a narrowing (64) and a suction channel (63), can be fabricated by as preferred by the user. The arrows in FIG. 12b show the fluid or liquid flows. Similar structures can be used for rotating or static seal applications in combination with all the described anchoring mechanisms.

(60) Surface tension seal
(61) Pump supply channel in
(62) Pump supply channel out
(63) Suction channel
(64) Venturi narrowing
(65) Restriction
(66) Cylinder
(67) Piston FIG. 13 shows a three dimensional sketch of a linear hydraulic actuator that is sealed using a surface tension seal, a pressure divider and a pump, in accordance with the invention. This sketch shows a cross section of the cylinder, hereby revealing the venturi pump that is integrated in the cylinder wall. In FIG. 13b, the actuator is rotated over 180° with respect to FIG. 13a and a quarter of the actuator has been cut away in order to show its inside.

(68) Cylinder
(69) Pump supply channel
(70) Venturi narrowing
(71) Suction channel
(72) Restriction
(73) Surface tension seal cavity
(74) Cylinder wall The configurations discussed above are not exhaustive; the described seal can be used in many other applications and configurations.

EXAMPLES

Example 1

Example of a Fabrication Process

Figure 14:
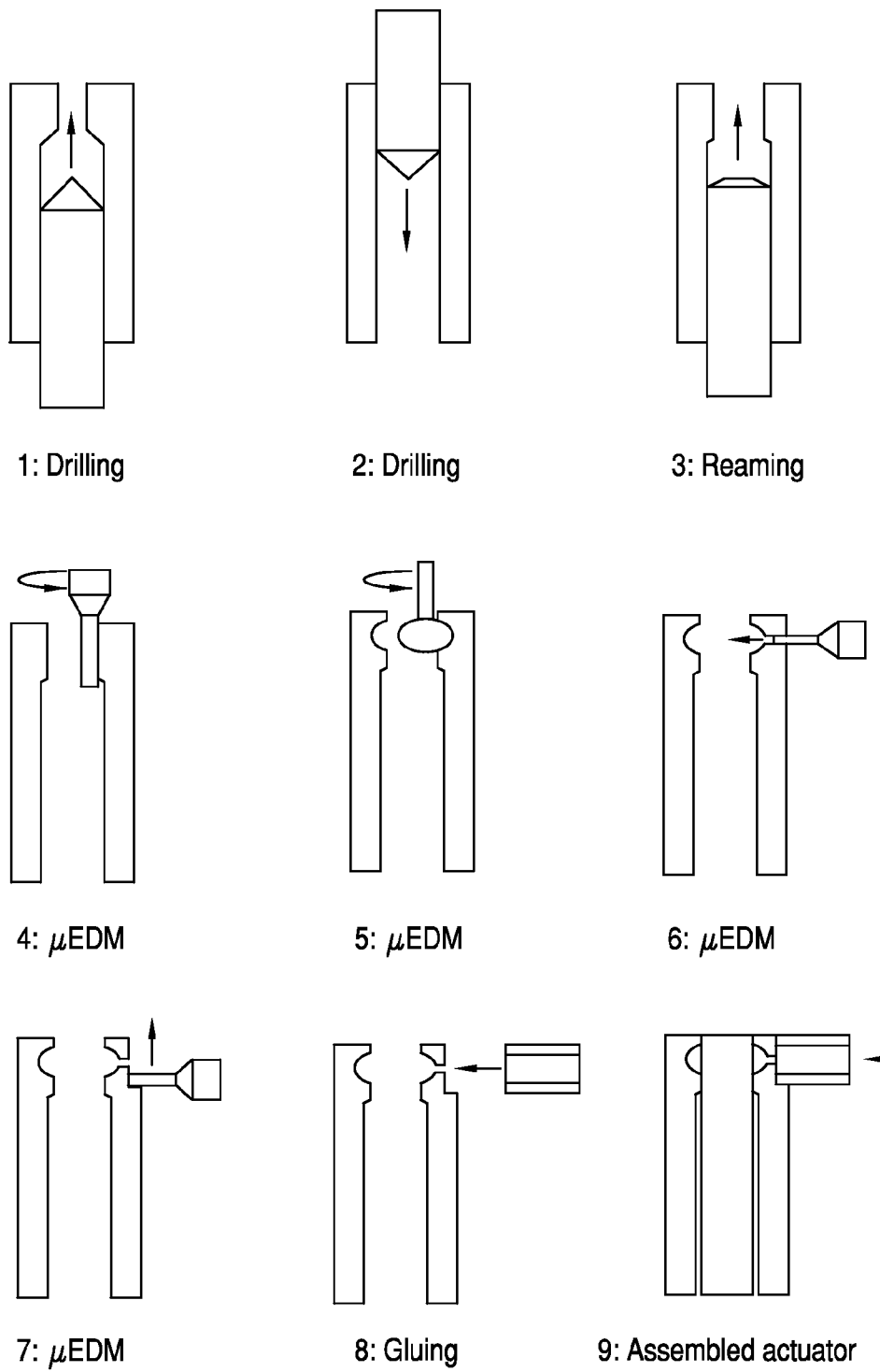

Intended as exemplary only a cylinder and seal was fabricated as one monolithic structure. This minimizes the number of components thus simplifying the assembly of the actuator. The cylinder and the seal were made of brass. The fabrication of the actuator was divided in 8 steps as outlined in FIG. 14. In the first two steps, drilling and reaming with miniature tools defined the rough actuator shape. In step three the dimensions and the surface quality of the cylinder were improved by reaming. A tight tolerance on the seal diameter was achieved with planetary Micro Electro Discharge Machining (μEDM) in step 4. Electrode wear was compensated by Wire Electro-Discharge Grinding (WEDG) (Song X. et al. Proc. of SPIE Symposium on Micromachining and Microfabrication, Paris, 1999, 792-799). Next, a WEDG formed electrode was used to make the seal cavity. In step 6, a connection channel was drilled using μEDM. Finally, a Ga supply channel was glued with low viscosity epoxy glue on a flattened surface (step 7 and 8). The bore of the actuator was 2 mm and the length is 22 mm.

An actuator with water or gallium as sealing fluid had successfully been tested up to 100 kPa. The actuator had a length of 22 mm, a bore of 2 mm, and a stroke of 20 mm and developed a force up to 0.2 N without leakage.

Other embodiments of the invention will be apparent to those skilled in the art from consideration of the specification and practice of the invention disclosed herein.

The invention claimed is:

1. An actuator comprising at least one fluid seal designed to separate fluids under different pressure, the actuator further comprising a pressure chamber, wherein the fluid seal comprises a surface tension seal (1, 14, 16, 21, 32, 44, 47, 56) relying on surface tension forces to resist an actuation pressure, and a pressure divider between the surface tension seal (1, 14, 16, 21, 32, 44, 47, 56) and a pressure chamber (6, 12, 37, 45, 51), the pressure divider comprising at least one leakage channel (2, 20, 33) and at least one pressure restriction (4, 23, 35) designed to prevent leakage at the surface tension seal.

2. The actuator according to claim 1, wherein the pressure divider comprises a restriction (4, 23) between the surface tension seal (1, 21) and pressure chamber (6) and said pressure divider forces the sealed fluid to flow through the restriction (4, 23) before it reaches the surface tension seal (1, 21).

3. The actuator according to claim 1, wherein the pressure divider further comprises a pressure rectifier.

4. The actuator according to claim 3, wherein the actuator further comprises a piston (9, 40) or piston rod (7), and the pressure rectifier is an annular cavity (3) between a leakage channel (2, 20) and the piston (9, 40) or the piston rod (7).

5. The actuator according to claim 3, wherein the pressure divider further comprises a restriction (4) between the pressure rectifier (3) and the pressure chamber (6).

6. The actuator according to claim 1, including a porous material (50), wherein the resistance of the pressure restriction (35) is increased by the porous material (50), and wherein fluids passing said pressure restriction are forced to pass through said porous material (50).

7. The actuator according to claim 1, including a labyrinth, wherein the resistance of the pressure restriction (35) is increased by the labyrinth (55), wherein fluids passing said pressure restriction are forced to pass through the labyrinth (55).

8. The actuator according to claim 1, including a pump (62) associated with the leakage channel (2, 63) and arranged to further reduce pressure on the surface tension seal.

9. The actuator according to claim 8, wherein the actuator is a cylinder actuator having a cylinder wall, and the pump is a venturi pump (61-64) integrated in the cylinder wall of the cylinder actuator.

10. The actuator according to claim 9, wherein the pump and cylinder are monolithic.

11. The actuator according to claim 1, wherein the leakage channel (2, 20) is provided to allow the small amount of fluid that passes through the restriction to flow back.

12. The actuator according to claim 1, the actuator further comprising a collecting means to collect fluid from the leakage channel (2, 20).

13. The actuator according to claim 1, the actuator further comprising a means to channel fluid from the leakage channel (2, 20) back to the side of lower pressure or to a low-pressure tube.

14. The actuator according to claim 1, wherein the pressure divider comprises an annular cavity (3) at the inner end of the channel (2) that is arranged to avoid radial fluctuations in the pressure working on the surface tension seal.

15. The actuator according to claim 1, wherein the surface tension seal is adapted to resist said pressure based on surface tension and to separate a fluid under actuating pressure (17) from a fluid under environmental pressure (19).

16. The actuator according to claim 1, wherein the surface tension seal (1, 14, 16, 21, 32, 44, 47, 56) comprises a seal cavity (11) filled with a sealing fluid separating the actuator pressure (Ph) from the environmental pressure (Pl).

17. The actuator according to claim 16, wherein the seal cavity (11) is connected to a seal fluid supply channel (10) to supply sealing fluid to said cavity.

18. The actuator according to claim 16, wherein the actuator is a piston driven actuator comprising a piston (9, 40) or a round piston rod (7), and wherein the seal cavity is an annular cavity around the piston (9, 40) or around the piston rod (7).

19. The actuator according to claim 16, wherein the sealing fluid comprises a component selected from the group consisting of water (H2O2), mercury (HG) and gallium (Ga).

20. The actuator according to claim 16, wherein the sealing fluid is an eutectic alloy.

21. The actuator according to claim 16, wherein the sealing fluid is under cooled.

22. The actuator according to claim 16, wherein the sealing fluid comprises a gallium alloy.

23. The actuator according to claim 1, wherein the surface tension seal (1, 14, 16, 21, 32, 44, 47, 56) comprises at least one fluid-O-ring.

24. The actuator according to claim 1, comprising an assembly of surface tension seals (1, 14, 16, 21, 32, 44, 47, 56) mounted in series to increase the maximum seal pressure.

25. The actuator according to claim 1 wherein the actuator comprises a cylinder having a cylinder wall comprising at least one surface tension seal (1, 14, 16, 21, 32, 44, 47, 56) for sealing a piston (9, 40) or a piston rod (7) and wherein the surface tension seal (1, 14, 16, 21, 32, 44, 47, 56) and the pressure divider (2-4) are integrated in the cylinder wall (8, 38).

26. The actuator according to claim 25, wherein the cylinder and the surface tension seal is a monolithic structure.

27. The actuator according to claim 1, wherein the actuator is a linear actuator.

28. The actuator according to claim 1, wherein the actuator is a hydraulic actuator.

29. The actuator according to claim 1, wherein the actuator is a pneumatic actuator.

30. The actuator according to claim 1, wherein the actuator is a hydro pneumatic actuator.

31. The actuator according to claim 1, wherein the actuator is a micro hydraulic actuator.

32. The actuator according to claim 1, wherein the actuator is a micro pneumatic actuator.

33. The actuator according to claim 1, wherein the actuator is a micro hydro pneumatic actuator.

34. The actuator according to claim 1, wherein the surface tension seal is anchored in the cylindrical actuator by contact with an inner annular wetting surface (18) zone in the inner non wetting surface of the cylinder.

35. The actuator according to claim 1, wherein the fluid seal is rotational.

36. The actuator according to claim 1, wherein the fluid seal is static.

37. The actuator according to claim 1, wherein the fluid seal is linear.

* * * * *